July 11, 1950
R. D. FAULKNER ET AL
2,514,752
LOADING TRUCK FOR TRAILER TRUCKS OR OTHER CARGO CARRIERS
Filed July 28, 1948
2 Sheets-Sheet 1
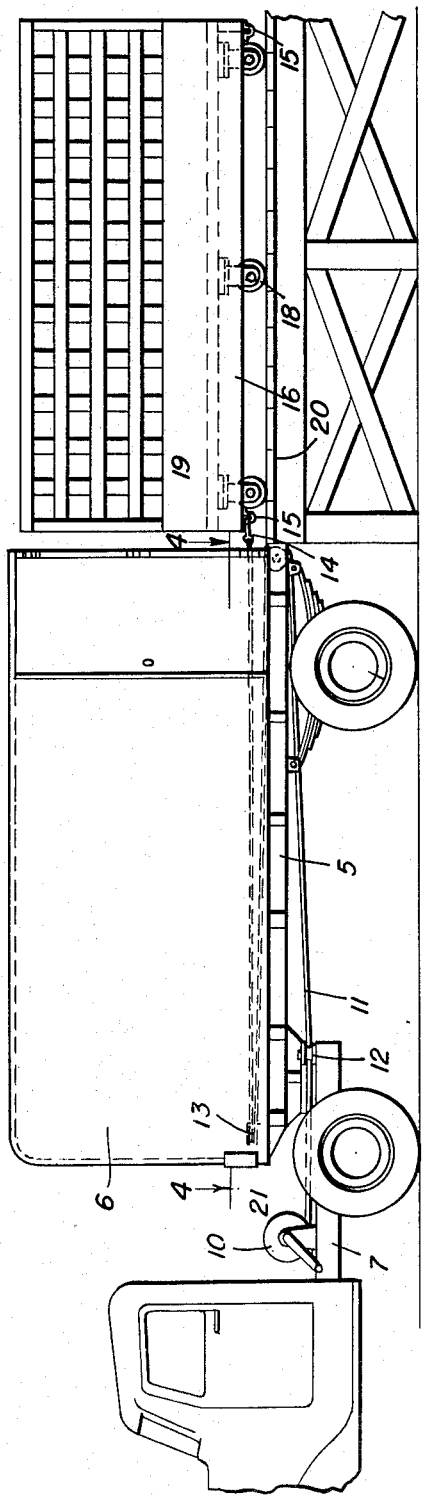
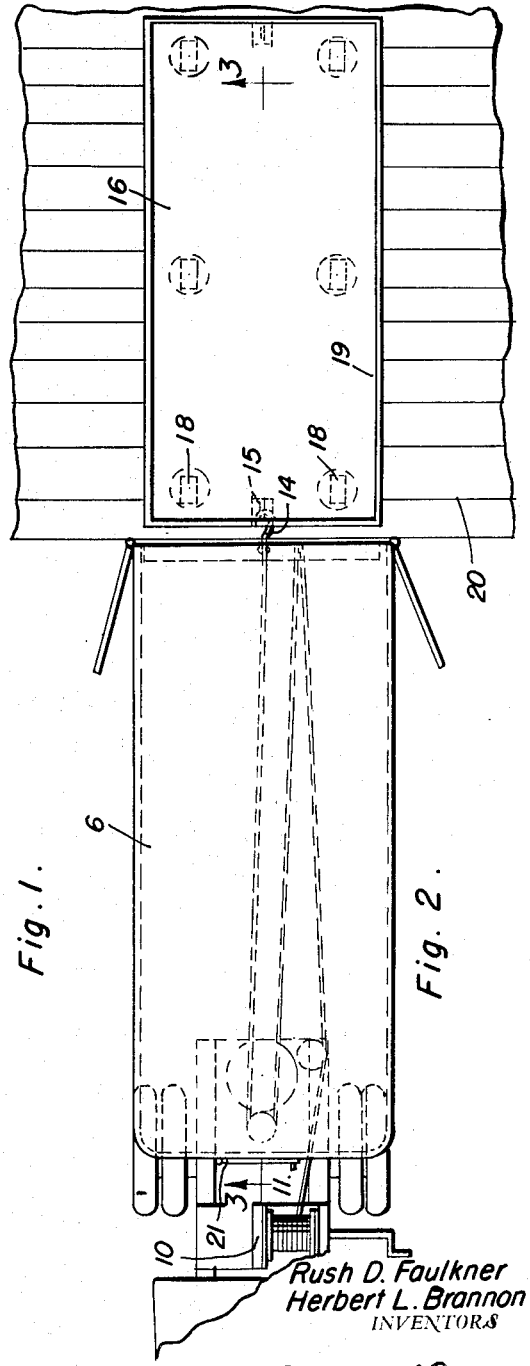
Rush D. Faulkner
Herbert L. Brannon
INVENTORS
BY Clarence A. O'Brien
and Harvey B. Jackson
Attorneys

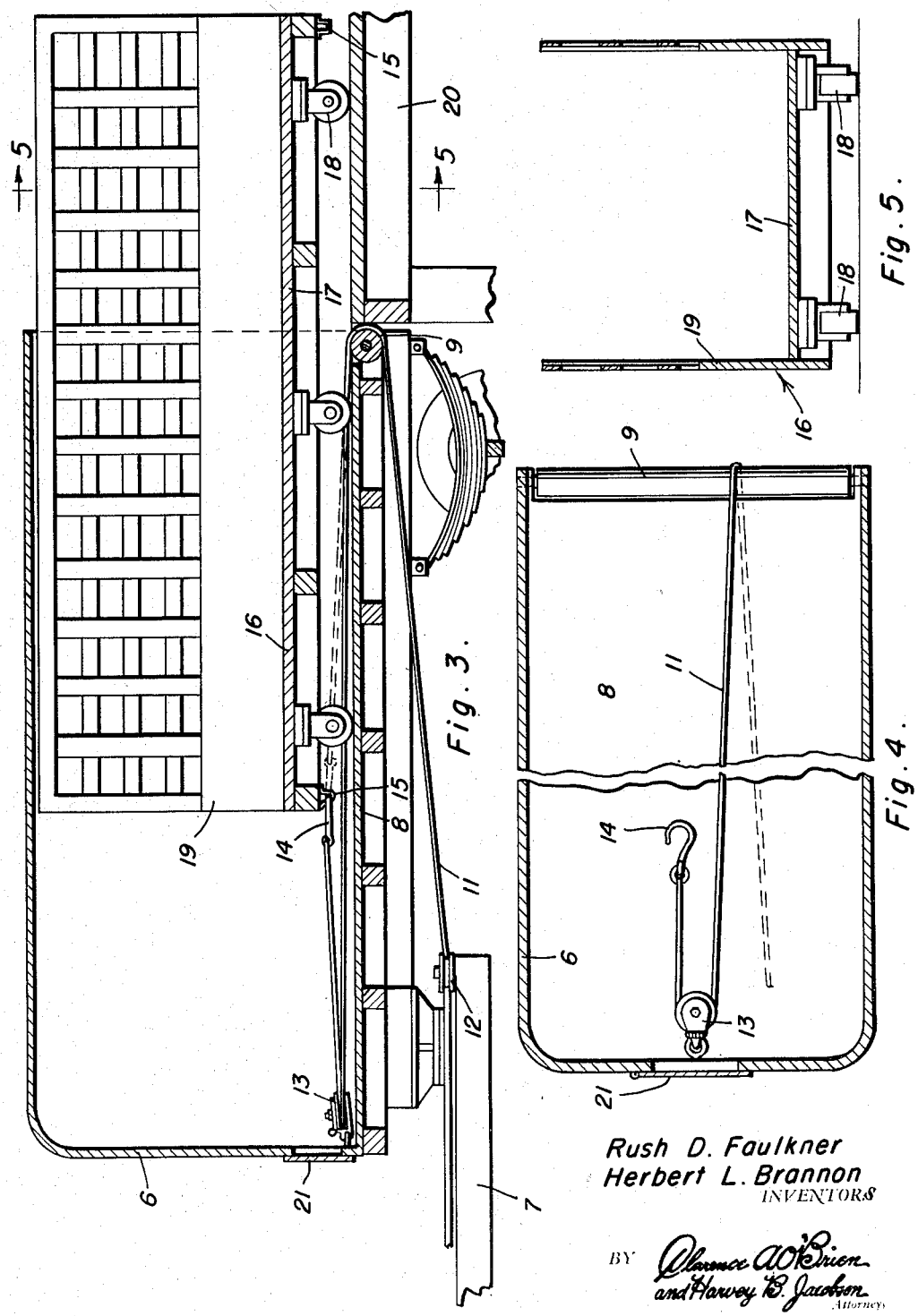

UNITED STATES PATENT OFFICE 2,514,752

LOADING TRUCK FOR TRAILER TRUCKS OR OTHER CARGO CARRIERS

Rush D. Faulkner and Herbert L. Brannon,
North Little Rock, Ark.

Application July 28, 1948, Serial No. 41,156

1 Claim. (Cl. 214—83.12)

The present invention relates to new and useful improvements in apparatus for loading and unloading trailer trucks, freight cars, airplanes and other cargo carriers from a warehouse platform or dock, and more particularly to means for loading and unloading a cargo carrier in a single operation whereby to reduce the time during which the carrier stands idle at the loading platform.

An important object of the invention is to provide a loading truck embodying a body mounted on caster wheels or rollers and of a capacity to hold an entire load for a trailer truck together with means for easily and quickly rolling the loading truck into and out of the body of a trailer truck from a loading platform to thus expedite the loading and unloading operation of the trailer truck.

A further object of the invention is to provide an apparatus of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the loading truck in position for loading onto a trailer truck;

Figure 2 is a top plan view;

Figure 3 is a longitudinal sectional view taken on the line 3—3 of Figure 2;

Figure 4 is a longitudinal sectional view of the trailer truck taken on the line 4—4 of Figure 1; and, Figure 5 is a transverse sectional view taken on the line 5—5 of Figure 3.

Referring now to the drawings in detail, wherein for the purpose of illustration we have disclosed a preferred embodiment of the invention, the numeral 5 designates a trailer truck which includes a trailer body 6 having its front end supported on the tractor 7 which tows the trailer.

The floor of the trailer body is shown at 8 and is provided at its rear end with a roller 9 extending throughout the width of the body.

A winch 10 is mounted on the tractor 7 for winding a cable 11 thereon, the cable extending rearwardly around a pulley 12 under the bottom 8 of the body and over the roller 9 and extends from the roller 9 forwardly in the body adjacent floor 8 and around a gate-type snatch block 13 suitably secured to the front end of the trailer body 6.

The free end of cable 11 is provided with a hook 14 for engaging an eye or ring 15 secured to the front end portion of the floor 16 of a loading truck 17. The floor of the loading truck 17 is supported on caster or swivel rollers 18, the bottom 16 of the loading truck having sides 19 suitably secured thereto and is open at each end, or may be closed at its front end.

The loading truck 17 is of a capacity to substantially hold the entire load of the trailer truck body 6, and, accordingly, the loading truck 17 may be moved in and out of a warehouse onto a loading platform 20 against which the rear end of the trailer truck 5 is backed, and by attaching the hook 14 of cable 11 to the eye or ring 15 at the front end of the loading truck, the latter may be pulled into the trailer truck body 6 and the loaded loading truck 16 shipped in the trailer.

When it is desired to unload the loading truck from the truck body 6, the cable 11 is removed from snatch block 13, access to which is afforded by means of a door 21 in the front end of body 6, and the cable then extends from front eye 15 directly over roller 9 whereby the winding of the cable on winch 10 will pull the loading truck outwardly at the rear of the trailer and onto the loading platform.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

In combination, a cargo carrier including a body, a winch mounted on the carrier forwardly of the body, a cable attached to the winch with its free end extending rearwardly under the body and forwardly into the body, rotatable cable guide means at the rear edge of the body, and rotatable cable guide means in the body at its front end and over which the cable is trained to extend the free end of the cable rearwardly from said front cable guide for attaching to a load to be pulled into the body, and a door in the front end of the body to provide access to the front cable guide for removing the cable therefrom to extend the free end of the cable in a forward direction to pull the load from the body.

RUSH D. FAULKNER.
HERBERT L. BRANNON.

REFERENCES CITED

The following references are of record in the file of this patent:

UNITED STATES PATENTS

| Number | Name | Date |
|---|---|---|
| 1,921,605 | Canfield | Aug. 8, 1933 |
| 1,933,211 | Flowers | Oct. 31, 1933 |
| 2,146,436 | Lima | Feb. 7, 1939 |
| 2,216,972 | Gibson et al. | Oct. 8, 1940 |
| 2,317,984 | Fitch | May 4, 1943 |

FOREIGN PATENTS

| Number | Country | Date |
|---|---|---|
| 357,105 | Great Britain | Mar. 11, 1930 |